(12) United States Patent
Keene et al.

(10) Patent No.: US 10,205,322 B1
(45) Date of Patent: Feb. 12, 2019

(54) ECONOMICALLY EFFICIENT OPERATION OF A POWER GENERATOR

(71) Applicant: Cummins Power Generation IP, Inc., Minneapolis, MN (US)

(72) Inventors: Kevin Keene, Coon Rapids, MN (US); Benjamin S. Fuchs, Andover, MN (US); Michelle Hunt, Minneapolis, MN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 322 days.

(21) Appl. No.: 15/064,197

(22) Filed: Mar. 8, 2016

Related U.S. Application Data

(60) Provisional application No. 62/130,189, filed on Mar. 9, 2015.

(51) Int. Cl.
| | |
|---|---|
| *G05D 11/16* | (2006.01) |
| *G05D 5/00* | (2006.01) |
| *G05D 9/00* | (2006.01) |
| *G05D 11/00* | (2006.01) |
| *H02J 3/38* | (2006.01) |
| *G05B 15/02* | (2006.01) |

(52) U.S. Cl.
CPC .............. *H02J 3/381* (2013.01); *G05B 15/02* (2013.01)

(58) Field of Classification Search
CPC ................................ H02J 3/381; H02J 3/3286
USPC ................................................. 700/287, 286
See application file for complete search history.

(56) References Cited

U.S. PATENT DOCUMENTS

| | | | |
|---|---|---|---|
| 4,261,037 | A | 4/1981 | Hicks |
| 4,604,714 | A | 8/1986 | Putman et al. |
| 5,886,895 | A | 3/1999 | Kita et al. |
| 6,583,521 | B1 | 6/2003 | Lagod et al. |
| 6,745,109 | B2 | 6/2004 | Kojima et al. |
| 6,757,591 | B2 | 6/2004 | Kramer |
| 7,284,709 | B2 | 10/2007 | Guyer |

(Continued)

FOREIGN PATENT DOCUMENTS

| | | |
|---|---|---|
| EP | 0 924 36 | 10/1983 |
| EP | 1 217 473 | 6/2002 |

(Continued)

*Primary Examiner* — Viet Q Nguyen
(74) *Attorney, Agent, or Firm* — Foley & Lardner LLP

(57) ABSTRACT

A method of operating a power generator comprises receiving, a fault code corresponding to an operating condition of the power generator being outside of an acceptable range. A generator controller determines a cost of increased maintenance or repairing damage associated with overriding the fault code and maintaining existing power output from the power generator through the operating condition. A cost of a utility fine or contractual penalty associated with shutting down the power generator is determined in response to the fault code. The generator controller compares the cost of the utility fine or contractual penalty associated with shutting down the power generator with the cost of increased maintenance or damage repair to the power generator associated with overriding the fault code and maintaining existing power output through the operating condition. In response to the comparing, the fault code is overridden continuing operation of the power generator.

27 Claims, 4 Drawing Sheets

(56) References Cited

U.S. PATENT DOCUMENTS

| | | | |
|---|---|---|---|
| 7,430,534 B2 * | 9/2008 | Lof | G01W 1/10 |
| | | | 705/22 |
| 7,637,653 B2 | 12/2009 | Pop et al. | |
| 7,711,655 B2 | 5/2010 | Abe et al. | |
| 8,295,953 B2 | 10/2012 | Piche | |
| 8,346,416 B2 | 1/2013 | Liu et al. | |
| 8,862,281 B2 * | 10/2014 | Yoneda | H02J 13/0079 |
| | | | 700/286 |
| 2003/0236593 A1 | 12/2003 | Schumacher | |
| 2004/0267408 A1 | 12/2004 | Kramer | |
| 2005/0283346 A1 | 12/2005 | Elkins et al. | |
| 2009/0118922 A1 * | 5/2009 | Heap | B60W 10/105 |
| | | | 701/54 |
| 2010/0198423 A1 | 8/2010 | Hirst | |
| 2011/0054965 A1 | 3/2011 | Katagiri et al. | |
| 2011/0161250 A1 | 6/2011 | Koeppel et al. | |
| 2012/0054139 A1 | 3/2012 | Nikovski et al. | |
| 2012/0059525 A1 | 3/2012 | Piche | |
| 2013/0006439 A1 | 1/2013 | Selvaraj et al. | |
| 2013/0018517 A1 | 1/2013 | Kalagnanam et al. | |
| 2013/0041483 A1 | 2/2013 | Piche | |
| 2016/0049822 A1 * | 2/2016 | Lee | H02J 7/0068 |
| | | | 307/66 |
| 2016/0246319 A1 * | 8/2016 | Shimakura | G05F 1/66 |
| 2016/0313716 A1 * | 10/2016 | Chen | H02J 4/00 |

FOREIGN PATENT DOCUMENTS

| | | |
|---|---|---|
| GB | 2 442 760 | 4/2008 |
| WO | WO-82/03482 | 10/1982 |
| WO | WO-2004/070507 | 8/2004 |
| WO | WO-2010/097891 | 9/2010 |
| WO | WO-2011/080548 | 7/2011 |
| WO | WO-2011/081967 | 7/2011 |
| WO | WO-2011/163431 | 12/2011 |

* cited by examiner

ECONOMICALLY EFFICIENT OPERATION OF A POWER GENERATOR

CROSS-REFERENCE TO RELATED APPLICATIONS

This application claims priority to and benefit of U.S. Provisional Patent Application No. 62/130,189, filed Mar. 9, 2015 and entitled "Economically Efficient Operation of a Power Generator," the entire disclosure of which is incorporated herein by reference.

FEDERAL FUNDING STATEMENT

This invention was made with government support under Contract No. DE-EE0003392 awarded by the U.S. Department of Energy. The U.S. Government has certain rights in this invention.

TECHNICAL FIELD

The present disclosure relates to operational systems for power generators. More particularly, the present disclosure relates to a control system for the economically efficient operation of a power generator.

BACKGROUND

Power generators are used for a variety of purposes. Typically, power generators utilize an internal combustion engine to drive an electric generator to produce electrical power. The applications of such power generators can range from residential to commercial uses, including both portable and stationary uses, standby/backup power, and the like.

In some jurisdictions, electrical utilities require owners and/or operators of power generators to contractually pre-designate periods of time for system operation. Maintaining reliable operation and overall system uptime are critical in these scenarios. When unanticipated system failures occur, penalties for violating utility agreements can be severe. These penalties can negate any savings that may have otherwise been achieved by operating a power generation system.

SUMMARY

One embodiment relates to a method of operating a power generator comprising a generator controller. A fault codes is received by the generator controller, the fault code corresponding to an operating condition of the power generator being outside of an acceptable range. A cost of increased maintenance or repairing damage to the power generator associated with overriding the fault code and maintaining existing power output through the operating condition is determined by the generator controller. A cost of a utility fine or contractual penalty associated with shutting down the power generator in response to the fault code is also determined by the generator controller. The cost of the utility fine or contractual penalty associated with shutting down the power generator is compared, by the generator controller, with the cost of increased maintenance or damage repair associated with overriding the fault code and maintaining existing power output through the operating condition. In response to the comparing, the fault code is overridden, and the operation of the power generator is continued.

Another embodiment relates to a controller for operating a power generator. The controller comprises a memory device and a processor that is communicatively coupled to the memory device. The processor is configured to receive a fault code corresponding to an operating conditions of the power generator being outside of an acceptable range. A cost of repairing damage to the power generator associated with overriding the fault code and maintaining existing power output through the operating condition is determined by the processor. The processor also determines a cost of a utility fine or other penalty associated with shutting down the power generator in response to the fault code. The processor is configured to then compare the cost of the utility fine or other penalty associated with shutting down the power generator with the cost of repairing damage to the power generator associated with overriding the fault code and maintaining existing power output through the operating condition. In response to comparing, the processor is configured to override the fault code and maintain existing power output through the operating condition so as to continue the operation of the power generator.

Still another embodiment relates to a computer-readable storage medium having machine instructions stored therein. The instructions are executable by a processor to cause the processor to receive a fault code corresponding to an operating condition of the power generator being outside of an acceptable range. A cost of repairing damage to the power generator associated with overriding the fault code and maintaining existing power output through the operating condition is determined by the processor, as well as a cost of a utility fine or a contractual penalty associated with shutting down the power generator in response to the fault codes. The instructions cause the processor to then compare the cost of the utility fine or contractual penalty associated with shutting down the power generator with the cost of repairing damage to the power generator associated with overriding the fault code and maintaining existing power output through the operating condition. In response to the comparing, the instructions are configured to override the fault code and maintain existing power output through the operating condition so as to continue the operation of the power generator In some embodiments, a power generation system comprises a power generator comprising an engine and an alternator, and a generator controller operatively coupled to the power generator. The generator controller is configured to receive a fault code corresponding to an operating condition of the power generator being outside of an acceptable range. The generator controller determines a cost of increased maintenance or repairing damage to the power generator associated with overriding the fault code and maintaining existing power output from the power generator through the operating condition. The generator controller also determines a cost of a utility fine or contractual penalty associated with shutting down the power generator in response to the fault code, and compares the cost of the utility fine or contractual penalty associated with shutting down the power generator with the cost of increased maintenance or damage repair to the power generator associated with overriding the fault code and maintaining existing power output through the operating condition. In response to the comparing, the generator controller overrides the fault code and maintains existing power output through the operating condition so as to continue operation of the power generator.

These and other features, together with the organization and manner of operation thereof, will become apparent from the following detailed description when taken in conjunction with the accompanying drawings.

BRIEF DESCRIPTION OF THE FIGURES

Like reference numbers and designations in the various drawings indicate like elements.

DETAILED DESCRIPTION OF VARIOUS EMBODIMENTS

Referring to the figures generally, the various embodiments disclosed herein relate to a system and method of operating a power generator. The system and method may control a system of one or more standby generators, one or more prime power generator (generators or gensets that produce constant power), one or more combined heat and power generators (cogeneration), one or more combined heat and power and cooling generators (trigeneration), or a combination of the above generator types or applications. In these generation systems, components of the power generator may experience events that lead to various operating conditions being outside of an acceptable range, or place the power generator to be in violation of local noise ordinances or pollution limitations (and thus incur a fine for the operator). As described herein, systems and methods are provided that determine an economically prudent operation mode for the power generator in response to these operating conditions. The determined operation mode may be configured to maintain existing power output, reduce or de-rate power output, or shutdown. The system and methods may determine any of these operation modes in order to extend component life, increase maintenance intervals, or avoid a utility penalty associated with shutting down the power generator or otherwise making it unavailable, in part or whole, to fulfilling contracted power supply obligations upon receiving a command or request from the utility or other contracted party. In alternative embodiments, the system and methods may determine any of these operation modes in order to extend component life, increase maintenance intervals, or avoid a contractual penalty associated with shutting down or reducing output of the power generator to fulfilling contracted critical heat or cooling supply obligations.

Figure 1:
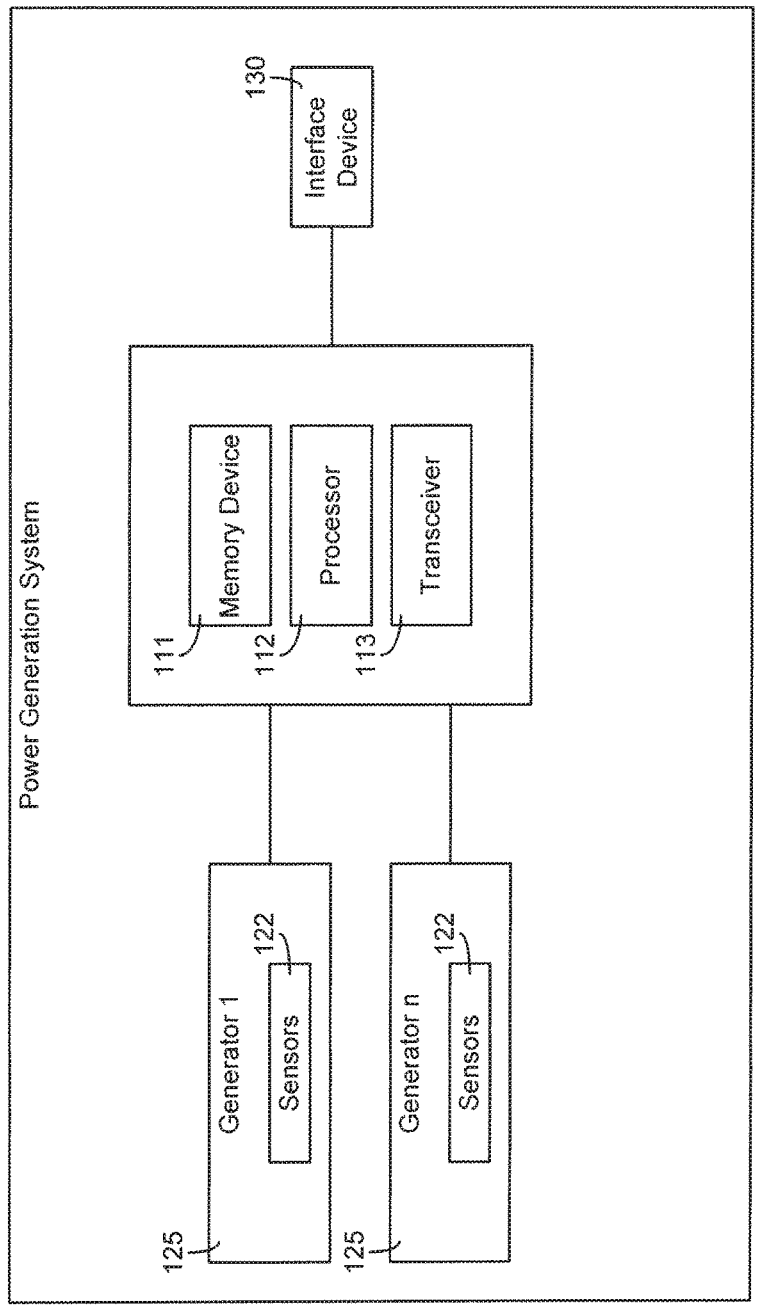
FIG. 1 is a representation of a generator control system for a power generator in accordance with one embodiment.

FIG. 1 is a representation of a generator control system for a power generator in accordance with one embodiment. As shown, the system 100 includes one or more power generators 125 operatively coupled to sensors 122, a memory device 111, a processor 112, a transceiver 113, and an interface device 130. As described more fully herein, the processor 112 receives the input parameters regarding the power generators 125 via sensors 122, and determines an economically efficient operation mode in order to extend component life, increase maintenance intervals, or avoid a utility penalty associated with shutting down the power generator 125.

Figure 2:
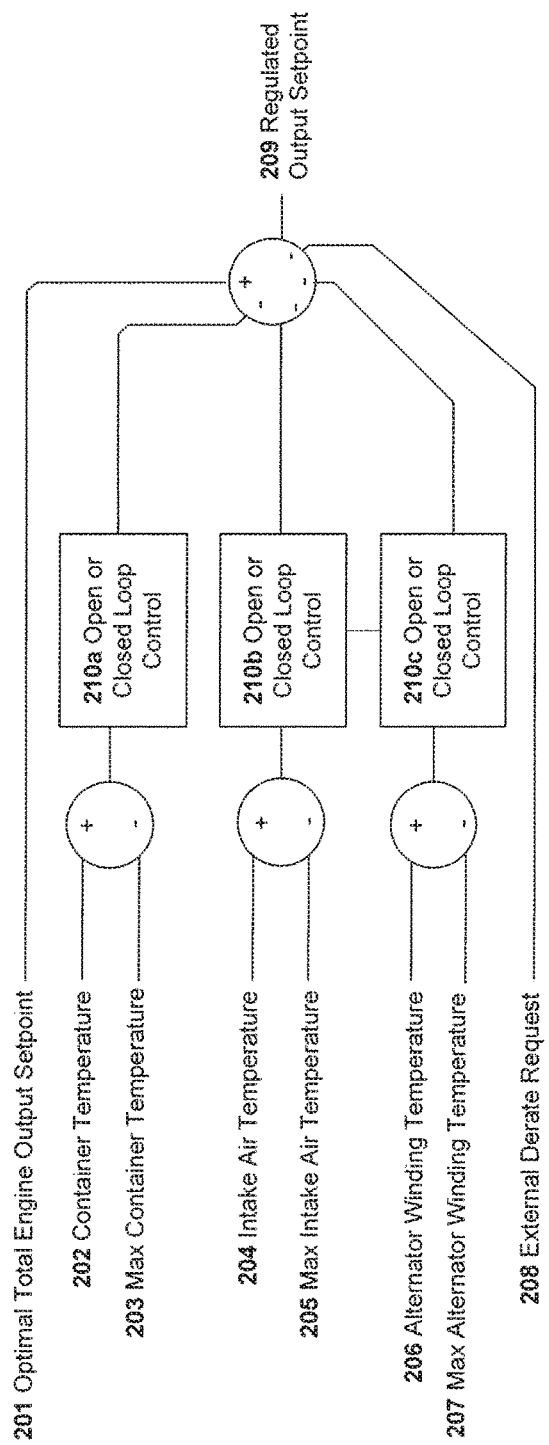
FIG. 2 is a diagram depicting a determination of an economically efficient operation mode of a power generator using monitored input parameters in accordance with one embodiment.

FIG. 2 is a diagram depicting a determination of an economically efficient operation mode of a power generator using monitored power generator input parameters in accordance with one embodiment. A setpoint control system 200 determines the operation mode based on one or more input parameters. The input parameters may include, but are not limited to, an alternator winding temperature 206, an engine temperature (not shown), a genset enclosure container temperature 202, an ambient air temperature (not shown), an intake air temperature 204, or other diagnostic conditions. The other predictive diagnostic conditions may relate to engine efficiency, a spark plug, oil life, an oil filter, or an air filter. In optimal conditions, the setpoint control system 200 operates the power generator at an optimal total engine output 201. The optimal total engine output 201 may be 100% or within a selected optimum power output range. During operation, the setpoint control system 200 receives one or more power generator input parameters. The setpoint control system 200 then determines that one or more power generator input parameters are above their associated maximum or minimum setpoint. The associated maximum or minimum setpoints may be, but are not limited to, a maximum alternator winding temperature 207, a maximum engine temperature, a maximum/minimum container temperature 203, a maximum/minimum ambient air temperature, or a maximum/minimum intake air temperature 205, a minimum oil pressure, a minimum fuel pressure, a minimum fuel quality (for example, methane number, gas quality, a maximum contaminate reading, etc.), a minimum amount of emissions reactant (such as urea or ammonia) or a maximum/minimum emissions output (such as NOx, CO, particulates, etc.).

In response to a given power generator input parameter operating above its associated maximum setpoint (or below its minimum setpoint), the setpoint control system 200 determines to increase a control loop 210 associated with the input parameter in proportion to an amount the input parameter exceeds its maximum/minimum setpoint. The setpoint control system 200 then subtracts from an optimal total engine output 201 the value of the control loop 210 to determine a regulated output setpoint 209. By determining the regulated output setpoint 209, the setpoint control system 200 prevents a shutdown or de-rate (a reduction of maximum surge output, maximum sustainable output, or other normal output capability) of the power generator 125, which would have occurred when the maximum or minimum setpoint was exceeded. In addition to avoiding shutdown, the setpoint control system 200 may also extend a life of a component and/or increase a maintenance interval of the power generator 125 in response to certain input parameters. For example, reducing the regulated output setpoint 209 when ambient temperature is high, or alternator winding temperature is high, or engine temperature is elevated to minimize lubrication or engine oil breakdown and excessive component wear. It is noted that control loops 210 can be implemented as either open or closed control loops to determine the regulated output setpoint 209. In addition, external de-rate requests can be input to the setpoint control system 200 by external systems or other generator subsystems utilizing the external de-rate request 208.

Figure 3:
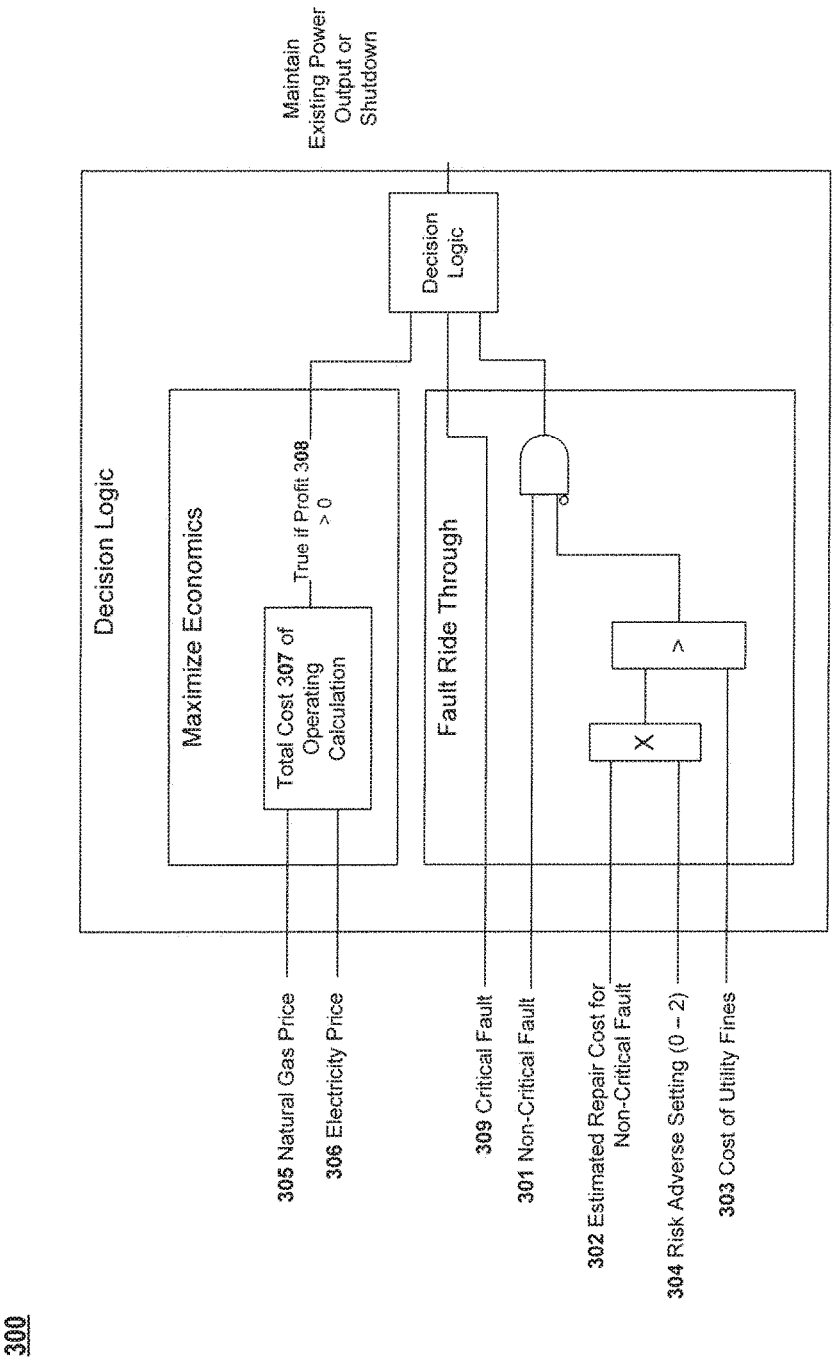
FIG. 3 is a diagram depicting a determination of an economically efficient operation mode of a power generator using cost of ownership differentiators in accordance with one embodiment.

FIG. 3 is a diagram depicting a determination of an economically efficient operation mode of a power generator using cost of ownership differentiators in accordance with one embodiment. The control system 300 determines the operation mode of the power generator based on one or more calculated total cost of ownership differentiators, such as an energy price. The energy price may include either or both of a natural gas price 305 or an electricity price 306. In one embodiment, each of the natural gas price 305 and the electricity price 306 is representative of an actual market price for natural gas and electricity, respectively. The natural gas price 305 and the electricity price 306 may be received by the control system 300 using a remote monitoring system. Using the natural gas price 305 (or other fuel cost, such as, but not limited to diesel fuel, propane, or gasoline) and the electricity price 306, the system 300 determines a total cost of operation 307 or profit of the power generator (in simple form, Benefit−Costs=Profit). The control system 300 uses the total cost of operation 307 of the power generator to determine if there is a profit 308 from operation. If there is a profit 308, then the control system 300 starts or maintains existing output of the power generator. If there is not a profit 308, then the system 300 determines to shut down the power generator. If used in a CHP configuration, if the conditions are profitable the CHP or tri-generation generator system can be allowed to auto-start and stop as required for heat or cooling demand, in one embodiment.

The control system 300 may also determine the operation mode of the power generator 125 based on other total cost of ownership differentiators, such as electrical utility contractual obligations. Utility contractual obligations may include utility or contractual penalties associated with shutting down the power generator or reducing its electrical, heat, or cooling output below a contracted level, or doing so with critical loads that require a minimum level of power support. Other total cost of ownership differentiators may include external penalties, fines, or costs for operating in violation of local noise ordinances (such as amount of run time or time of day restrictions), fuel use restrictions (such as during cold weather heating supply restrictions), or pollution limitations (such as site pollution restrictions/limitations or for output during local air quality alerts).

In one embodiment, the control system 300 may determine that it is operating during an power export or island utility schedule period. In the export utility schedule period, a recipient facility receives all of its electricity from the power generator and/or other distributed generation with excess power being placed back on the utility grid if in export mode; none of the recipient's electricity is taken from a utility service. Distributed generation is a source of power other than the power generator and the utility service, such as separately burning natural gas or oil to produce heat or steam. The control system 300 determines the export-only utility schedule period from stored utility agreement data. The stored utility agreement data may include an import/export schedule and may also include a contractually pre-designated time period during which the power generator must provide all electricity to the recipient facility. The stored utility agreement data may input into the control system 300 by an owner or operator of the power generator using an interface device 130. Other possible power agreements with the utility can include, but are not limited to, peaking power supply agreements (where the power generator supplies power to the coupled utility grid when signaled by the utility during peak power demand periods), and power conditioning agreements (where the generator is coupled to the grid to smooth and condition the power on the local utility grid or to correct power factor).

Again referring to FIG. 3, in accordance with one embodiment, the control system 300 (e.g., the generator controller) receives a fault code corresponding to one or more operating conditions of the power generator being outside of an acceptable range. The fault code may be a critical fault code 309 or a non-critical fault code 301. If the control system 300 receives a critical fault code 309, it may shut down the power generator to avoid catastrophic damage. If the control system 300 receives a non-critical fault code 301, it may determine the economically prudent operating mode based on the severity of the non-critical fault. The control system 300 then determines a cost of repair 302 of damage to the generator or generator system and/or increased cost of maintenance associated with overriding the one or more non-critical fault codes 301 and maintaining existing power output through the one or more operating conditions.

It is noted that in some conditions, critical faults can also be overridden if the cost of the fine or penalty is high enough or if the critical fault is associated with a likelihood of damage (low to moderate probability of catastrophic damage or low repair cost) as opposed to a certainty (or a high probability or high repair cost). The control system 300 also determines the cost of a utility fine 303 and/or a contractual penalty associated with shutting down the generator system in response to the one or more non-critical fault codes 301. The cost of repair 302 of damage to the power generator may be determined from a stored (or network referenced) repair cost related to the maintenance condition associated with the power generator. The stored repair cost may be an estimated mechanical component costs and/or an estimated labor cost. The cost of the utility fine 303 may be determined from a stored (or network referenced) utility agreement data corresponding to the electrical power import/export schedule and related violation penalties. The cost of the utility fine 303 may be, for example, a per unit energy (such as kWh) penalty.

The control system 300 may compare the cost of the utility fine and/or contractual penalty associated with shutting down the power generator with the cost of increased maintenance or damage repair to the power generator associated with overriding the fault code and maintaining existing power output through the operating condition. In response to the comparing, the control system 300 may override the fault code (e.g., a non-critical fault code) and continue operation of the power generator.

For example, if the cost of the utility fine and/or contractual penalty associated with shutting down the power generator is greater than the cost of increased maintenance or damage repair to the power generator associated with overriding the fault code (e.g., a non-critical fault code) and maintaining existing power output through the operating condition, the control system 300 may override the fault code and continue operation of the power generator. This may save cost and allow operation of the power generator until a more suitable opportunity (e.g., a scheduled power generator maintenance which does not incur a fine or contractual penalty or the non-critical fault code converts into a critical fault code) is available.

In other embodiments, the control system 300 may override the fault code even if the cost of the utility fine and/or contractual penalty associated with shutting down the power generator is equal to or less than the cost of increased maintenance or damage repair to the power generator associated with overriding the fault code (e.g., a non-critical fault code) and maintaining existing power output through the operating condition so as to continue operating the power generator. For example, the power generator may not be shut down if the difference in cost of the utility fine and/or the contractual penalty is less than the cost of increased maintenance or damage repair but within a predetermined amount threshold.

In one embodiment, instead of shutting down the power generator in response to a critical or non-critical fault code 301 and incurring the entire cost of a utility fine 303, the control system 300 determines to reduce the power output of the power generator to a level that reduces the cost of repairing damage to the power generator and reduces the cost of a utility fine 303. Alternatively, where eventual shutdown of the power generator due to the fault code or exceeded operating threshold is inevitable or increasingly probable, the control system 300 can determine to maintain power output of the power generator to gain a lower cost of the utility fine 303, or minimizes the aggregate cost of maintenance or repair of the power generator and the incurred utility fine 303, or determined low cost combination thereof. This operation mode minimizes the cost of repair 302 of damage to the power generator while still contributing some power output. The reduced power output level is at least one of a predetermined level or a level determined from the specific operating conditions generating the critical/noncritical fault code 301. By way of example only, in response to a critical or noncritical fault code 301, the control system 300 determines to reduce or de-rate power output.

By reducing, but not eliminating, power output, the control system 300 reduces or eliminates the cost of a utility fine 303 while at the same time reducing or eliminating the cost of repair 302 of damage to the power generator. In another embodiment, the power generator may be operating in parallel alongside one or more other separate power generators, each contributing power output to the recipient facility or utility grid. The control system 300 determines to increase power output of the one or more separate power generators, even at the expense of likely increased or accelerated future maintenance, or temporarily exceeding select non-critical operation thresholds or setpoint control system 200 settings on the paralleled power generators (for example, engine temperatures or alternator winding temperature), to offset the reduced or absent output of the power generator receiving the critical/non-critical fault code 301. In doing so, the control system 300 reduces or eliminates the cost of repair 302 of damage to the power generator exhibiting the fault and also reduces or eliminates the cost of a utility fine 303.

In another embodiment, such as when operating after the setpoint control system 200 or control system 300 has already reduced power output, and a further reduction in power may not be permitted. In these circumstances, the available operation modes in response to a non-critical fault code 301 are limited to maintain existing power output or shutdown. In some circumstances, the control system 300 may estimate that, given the severity of the critical or non-critical fault 301, the power generator is likely to continue operation through the contractually pre-designated time period. The control system 300 then determines that the cost of the utility fine 303 associated with shutting down the power generator in response to the one or more fault codes 301 is greater than the cost of repair 302 of damage to the power generator associated with overriding the one or more fault codes and maintaining existing power output through the one or more operating conditions. Upon this determination, the control system 300 determines to override the critical/non-critical fault 301 and maintain existing power output through the one or more operating conditions.

In one embodiment, prior to determining whether the cost of the utility fine 303 is greater than the cost of repair 302, the control system 300 multiplies the cost of repair 302 with a risk adverse setting 304. The risk adverse setting 304 in the example embodiment illustrated in FIG. 3 may be a value from 0 to 2, with 0 favoring the utility and 2 favoring protection of the power generator system. Thus, when the risk adverse setting 304 is 0, the cost of the utility fine 303 will always be greater than the cost of repair 302 and the control system 300 will determine to not shut down the power generator. It is noted however that other risk adverse level settings and setting granularity are possible and contemplated.

The control system 300 may determine that the cost of the utility fine 303 associated with shutting down the power generator is less than the cost of repair 302 of damage to the power generator associated with overriding the one or more critical or non-critical fault codes 301 and maintaining existing power output through the one or more operating conditions. Upon this determination, the control system 300 determines to shut down the power generator.

The control system 300 may estimate that given the severity of the non-critical fault 301, the power generator will shut down or be unavailable during the contractually pre-designated time period. The control system 300 determines that the cost of the utility fine 303 associated with shutdown is greater than the cost of repair 302 of damage to the combined heat and power generator associated with overriding the one or more critical or non-critical fault codes 301 and operating through the one or more operating conditions. However, because the power generator will shut down during the contractually pre-designated time period, the control system 300 determines to maintain existing power output until a threshold or minimum aggregate shutdown cost is achieved, at which point the control system 300 determines to shut down the power generator. The aggregate shutdown cost may be the cost of the utility fine 303 plus the cost of repair 302 of damage to the power generator associated with overriding the one or more fault codes 301 and maintaining existing power output through the one or more operating conditions. Both the cost of the utility fine 303 and the cost of repair 302 may be a function of time; thus, continued operation of the power generator may increase the cost of repair 302 (or alternatively, increase the probability of damage or of a critical failure, but actual damage may or may not occur) but decrease the cost of the utility fine 303.

The control system 300 determines to shut down the power generator at the time associated with the aggregate shutdown cost or probabilistic aggregate shutdown cost. The threshold may be when the aggregate shutdown cost is at a minimum for the contractually pre-designated time period. In an alternative embodiment, there may be different utility fines for different levels of output that fall below the contracted or required level. The control system 300 in this alternative embodiment can determine to maintain power generator output until a minimum aggregate cost of maintenance (or probability of cost) and the cost of the utility fine is achieved before reducing power generator output (or "de-rating" the power generator) to a lower, but sustainable output level to address the non-critical error. In general, a derate is when one reduces the overall output or the maximum limits (i.e., maximum surge current, or voltage) of a genset to limit the potential damage or other adverse outcomes. A derate effectively re-rates the genset on the fly to take into account current operating conditions. A classic example is derating a genset due to recent high output (alternator coils overheating), or due to ambient temperatures (either a too hot environment or, in some cases, too cold), or due to altitude of operation. Other reasons for derate can include, but are not limited to noise (if operating in an urban environment), or time of day. Recently (i.e., Tier 4 EPA requirements for off road equipment and gensets)

genset emissions and the functioning of the genset after treatment system has also become a reason to derate or shutdown genset operation.

Figure 4:
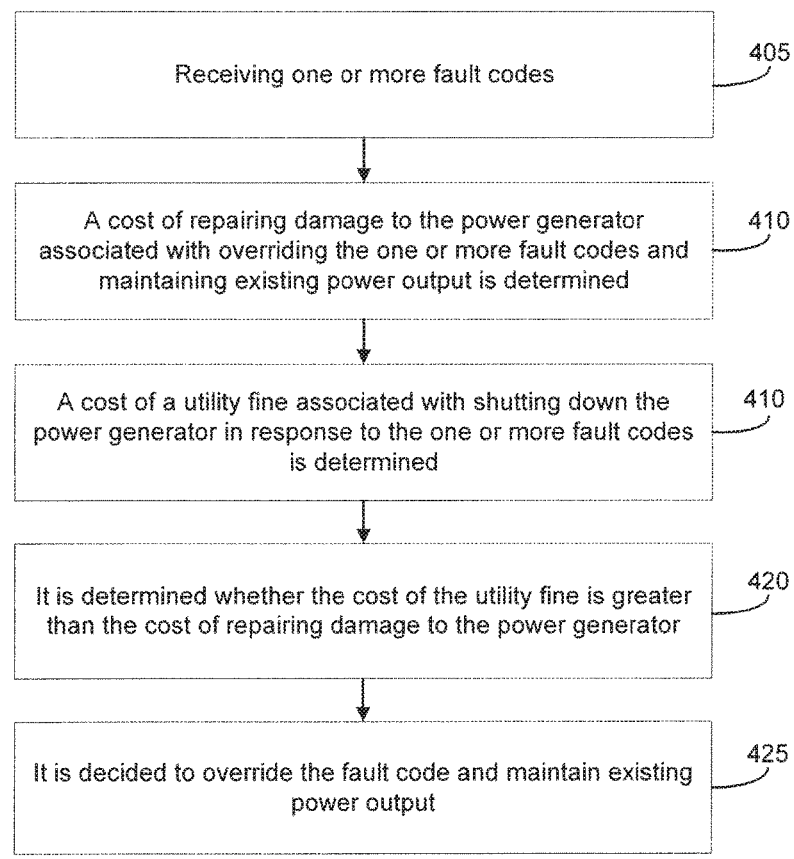
FIG. 4 is a flow diagram showing an example process for operating a power generator in accordance with one embodiment.

FIG. 4 is a flow diagram showing an example process for operating a power generator in accordance with one embodiment. The process 400 can be implemented, for example, on a computing device. In one implementation, the process 400 is encoded on a computer-readable medium that contains instructions that, when executed by a computing device, cause the computing device to perform operations of the process 400.

The process 400 depicted in FIG. 4 includes, at 405, receiving one or more fault codes. At 410, a cost of repairing damage to the power generator associated with overriding the one or more fault codes and maintaining existing power output is determined. At 415, a cost of a utility fine associated with shutting down the power generator in response to the one or more fault codes is determined. At 420, it is determined whether the cost of the utility fine is greater than the cost of repairing damage to the power generator. If it is determined that the cost of the utility fine is greater than the cost of repairing damage to the power generator, then at 425 it is decided to override the fault code and maintain existing power output (425).

The present disclosure contemplates methods, systems, and program products on any machine-readable media for accomplishing various operations. As mentioned above, in certain embodiments, the controllers implementing the setpoint control system 200 and the control system 300 form a processing system or subsystem (of system 100) including one or more computing devices having memory, processing, and communication hardware. The controllers may be a single device or a distributed device, and the functions of the analyzer may be performed by hardware and/or as computer instructions on a non-transient computer (or machine) readable storage medium. Such computer-readable media can be any available media that can be accessed by a general purpose or special purpose computer or other machine with a processor. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. In certain embodiments, the controllers include one or more modules structured to functionally execute the operations of the controllers. The description herein including the components of the controllers emphasize the structural independence of the aspects of the controller, and illustrates one grouping of operations and responsibilities of the controller. Other groupings that execute similar overall operations are understood within the scope of the present application. Modules may be implemented in hardware and/or as computer instructions on a non-transient computer readable storage medium, and modules may be distributed across various hardware or computer based components.

Example and non-limiting module implementation elements include sensors providing any value determined herein, sensors providing any value that is a precursor to a value determined herein, datalink and/or network hardware (i.e., transceiver 113) including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The term "processor" includes all kinds of agent, devices, and machines for processing data, including by way of example a programmable processor, a computer, a system on a chip, or multiple ones, or combinations, of the foregoing. The agent can include special purpose logic circuitry, e.g., an FPGA (field programmable gate array) or an ASIC (application-specific integrated circuit). The agent can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The agent and execution environment can realize various different computing model infrastructures, such as web services, distributed computing and grid computing infrastructures. When information is transferred or provided over a network or another communications connection (either hardwired, wireless, or a combination of hardwired or wireless) to a machine, the machine properly views the connection as a computer (or machine) readable medium, like that described above. Thus, any such connection is properly termed a computer-readable medium.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method of operating a power generator comprising a generator controller, the method comprising:
   receiving, by the generator controller, a fault code corresponding to an operating condition of the power generator being outside of an acceptable range;
   determining, by the generator controller, a cost of increased maintenance or repairing damage to the power generator associated with overriding the fault code and maintaining existing power output from the power generator through the operating condition;
   determining, by the generator controller, a cost of a utility fine or contractual penalty associated with shutting down the power generator in response to the fault code;
   comparing, by the generator controller, the cost of the utility fine or contractual penalty associated with shutting down the power generator with the cost of increased maintenance or damage repair to the power generator associated with overriding the fault code and maintaining existing power output through the operating condition; and
   in response to the comparing, overriding the fault code and continuing operation of the power generator.

2. The method of claim 1, wherein the cost of increased maintenance or repairing damage further includes one of calculating a probability of damage from continued operation the power generator and a probability the need for increased or accelerated maintenance on the power generator.

3. The method of claim 2, wherein the cost of repairing damage, the probability of damage, or the cost of increased maintenance to the power generator increases as a function of time, and wherein the cost of repairing damage and the cost of increased maintenance each comprises an estimated cost or an actual cost.

4. The method of claim 1, wherein continuing operation of the power generator comprises causing a reduction in the power output of the power generator to a level that reduces the cost of the increased maintenance or damage repair to the generator and reduces the cost of the utility fine or contractual penalty.

5. The method of claim 4, wherein the reduced power output level is determined based upon the operating condition generating the fault code.

6. The method of claim 1, wherein comparing, by the generator controller, the cost of the utility fine or contractual penalty associated with shutting down the power generator with the cost of repairing damage to the power generator further comprises determining if the cost of the utility fine, contractual penalty, or other contractual obligation is greater than the cost of continuing operation, wherein continuing operation corresponds to a violation of at least one of a local noise ordinances, fuel use restrictions, or pollution limitations.

7. The method of claim 1, wherein the power generator is a combined heat and power generator or a combined heat and power and cooling generator.

8. The method of claim 1, wherein the cost of a utility fine or contractual penalty associated with shutting down the power generator decreases as a function of time.

9. The method of claim 1, further comprising:
   determining that the power generator will shut down during a contractually pre-designated time period;
   determining an aggregate shutdown cost from the cost of the utility fine associated with shutting down the power generator and the cost of increased maintenance or damage repair to the power generator associated with overriding the fault code and maintaining existing power output through the operating condition; and
   shutting down the power generator when the aggregate shutdown cost reaches a predetermined threshold or minimum aggregate for the contractually pre-designated time period.

10. The method of claim 9, wherein the aggregate shutdown cost comprises the cost of increased maintenance or damage repair to the power generator associated with overriding the fault code and maintaining existing power output through the operating condition added to the cost of the utility fine or contractual penalty associated with shutting down the power generator.

11. The method of claim 9, wherein the predetermined threshold is the minimum aggregate shutdown cost for the contractually pre-designated time period.

12. The method of claim 1, wherein the power generator comprises a plurality of power generators.

13. The method of claim 1, further comprising:
    receiving an indication of at least one of an energy cost and value;
    determining a profit from operating the power generator based upon a difference between energy price and at least one of a maintenance cost, a fuel price, or a replacement cost amortization; and
    if the profit is greater than a predetermined threshold, maintaining existing power output of the power generator.

14. The method of claim 13, wherein the at least one of the energy cost and value comprises at least one of a fuel price and an electricity price.

15. The method of claim 13, wherein the energy price is received in real-time via remote monitoring.

16. A controller for operating a power generator comprising:
    a memory device; and
    a processor communicatively coupled to the memory device and configured to:
      receive a fault code corresponding to an operating condition of the power generator being outside of an acceptable range;
      determine a cost of repairing damage to the power generator associated with overriding the fault code and maintaining existing power output of the power generator through the operating condition;
      determine a cost of a utility fine or contractual penalty associated with shutting down the power generator in response to the fault code;
      compare the cost of the utility fine or contractual penalty associated with shutting down the power generator with the cost of repairing damage to the power generator associated with overriding the fault code and maintaining existing power output through the operating condition; and in response to the comparing, override the fault code and maintain existing power output through the operating condition, so as to continue operation of the power generator.

17. The controller of claim 16, wherein the processor is configured to cause a reduction in the power output of the power generator to a level that reduces the cost of repairing damage to the generator and reduces the cost of the utility fine or contractual penalty to an aggregate minimum.

18. The controller of claim 16, wherein the cost of repairing damage further comprises a cost of increased maintenance and the cost of damage repair to the power generator.

19. The controller of claim 17, wherein the reduced power output level is determined based upon the operating condition generating the fault code.

20. The controller of claim 16, wherein the processor is configured to:
   determine that the power generator will shut down during a contractually pre-designated time period;
   determine an aggregate shutdown cost from the cost of the utility fine associated with shutting down the power generator and the cost of repairing damage to the power generator associated with overriding the fault code and maintaining existing power output through the operating condition; and
   shut down the power generator when the aggregate shutdown cost reaches a minimum aggregate for the contractually pre-designated time period.

21. A non-transitory computer-readable storage medium having machine instructions stored therein, the instructions being executable by a processor of a power generator controller to cause the processor to:
   receive a fault code corresponding to an operating condition of apower generator being outside of an acceptable range;
   determine a cost of repairing damage to the power generator associated with overriding the fault code and maintaining existing power output of the generator through the operating condition;
   determine a cost of a utility fine or a contractual penalty associated with shutting down the power generator in response to the one or more fault codes;
   compare the cost of the utility fine or the contractual penalty associated with shutting down the power generator with the cost of repairing damage to the power generator associated with overriding the fault code and maintaining existing power output through the operating condition; and
   in response to the comparing, override the fault code and maintain existing power output through the operating condition so as to continue operation of the power generator.

22. The non-transitory computer-readable storage medium of claim 21, wherein the instructions are executable by the processor to cause the processor to reduce the power output of the power generator to a level that reduces the cost of repairing damage to the generator and reduces the cost of the contractual penalty.

23. The non-transitory computer-readable storage medium of claim 22, wherein the instructions are executable by the processor to cause the processor to determine the reduced power level based upon the one or more operating conditions generating the fault code.

24. The non-transitory computer-readable storage medium of claim 21, wherein the instructions are further executable by the processor to cause the processor to:
   determine that the power generator will shut down during a contractually pre-designated time period;
   determine an aggregate shutdown cost from the cost of the contractual penalty associated with shutting down the power generator and the cost of repairing damage to the power generator associated with overriding the fault code and maintaining existing power output through the operating condition; and
   shut down the power generator when the aggregate shutdown cost reaches a minimum aggregate for the contractually pre-designated time period.

25. A power generation system, comprising:
   a power generator comprising an engine and an alternator; and
   a generator controller operatively coupled to the power generator, the generator controller configured to:
      receive a fault code corresponding to an operating condition of the power generator being outside of an acceptable range;
      determine a cost of increased maintenance or repairing damage to the power generator associated with overriding the fault code and maintaining existing power output from the power generator through the operating condition;
      determine a cost of a utility fine or contractual penalty associated with shutting down the power generator in response to the fault code;
      compare the cost of the utility fine or contractual penalty associated with shutting down the power generator with the cost of increased maintenance or damage repair to the power generator associated with overriding the fault code and maintaining existing power output through the operating condition; and
      in response to the comparing, override the fault code and maintain existing power output through the operating condition so as to continue operation of the power generator.

26. The power generation system of claim 25, wherein the generator controller is further configured to:
   determine if the cost of the utility fine or contractual penalty associated with shutting down the power generator is greater than the cost of increased maintenance or damage repair to the power generator associated with overriding the fault code and maintaining existing power output through the operating condition, and
   in response to the determination that the cost of the utility fine or contractual penalty is greater than the cost of increased maintenance or damage repair to the power generator, overriding the fault code and continuing operation of the power generator.

27. The power generation system of claim 25, wherein the generator controller is further configured to:
   determine that the power generator will shut down during a contractually pre-designated time period;
   determine an aggregate shutdown cost from the cost of the contractual penalty associated with shutting down the power generator and the cost of repairing damage to the power generator associated with overriding the fault code and maintaining existing power output through the operating condition; and
   shut down the power generator when the aggregate shutdown cost reaches a minimum aggregate for the contractually pre-designated time period.

* * * * *